United States Patent [19]

Naoi et al.

[11] Patent Number: 5,339,868
[45] Date of Patent: Aug. 23, 1994

[54] BENT PIPE HAVING SECTIONAL FORM OF HIGH STRENGTH

[75] Inventors: Hisashi Naoi; Yasusuke Inoue, both of Sagamihara; Tetsuo Nagasaka, Tokyo; Yoichi Matsubara; Masaaki Takagishi, both of Kawasaki; Seiichi Akizawa, Yokohama, all of Japan

[73] Assignee: Nippon Steel Corporation, Tokyo, Japan

[21] Appl. No.: 982,038

[22] Filed: Nov. 24, 1992

Related U.S. Application Data

[63] Continuation of Ser. No. 727,342, Jul. 8, 1991, abandoned, which is a continuation of Ser. No. 483,301, Feb. 21, 1990, abandoned, which is a continuation of Ser. No. 196,195, filed as PCT/JP88/00008, Jan. 6, 1988, abandoned.

[30] Foreign Application Priority Data

May 26, 1987 [JP] Japan ................ 62-129435
Jan. 6, 1988 [JP] Japan ................ 62-1421

[51] Int. Cl.$^5$ ............................ F16L 09/02
[52] U.S. Cl. ............... 138/172; 138/39; 138/177; 72/369
[58] Field of Search ............ 138/39, 172, 177, 178, 138/DIG. 8; 72/369, 370

[56] References Cited

U.S. PATENT DOCUMENTS

| | | | |
|---|---|---|---|
| 298,059 | 5/1884 | Bennett | 138/39 |
| 1,960,557 | 5/1934 | Snyder | 138/155 |
| 2,057,038 | 10/1936 | Lindquist et al. | 285/179 |
| 2,303,949 | 12/1942 | Nordell | 138/39 |
| 2,441,299 | 5/1948 | Taylor | 72/369 |
| 2,689,596 | 9/1954 | Huet | 72/369 |
| 2,983,995 | 5/1961 | Greese | 72/369 |
| 2,996,100 | 8/1961 | Newhall et al | 72/369 |
| 3,473,361 | 10/1969 | Cwik | 72/369 |
| 3,869,776 | 3/1975 | Moshnin et al. | 72/369 |
| 3,869,917 | 3/1975 | Lapp | 72/369 |
| 4,378,122 | 3/1983 | Ohno et al. | 138/172 |
| 4,432,123 | 2/1984 | Minning et al. | 72/369 |

FOREIGN PATENT DOCUMENTS

| | | |
|---|---|---|
| 45-33019 | 10/1970 | Japan . |
| 54-162227 | 12/1979 | Japan . |
| 58-2726 | 1/1983 | Japan . |
| 58-200893 | 11/1983 | Japan . |

Primary Examiner—James E. Bryant, III
Attorney, Agent, or Firm—Wenderoth, Lind & Ponack

[57] ABSTRACT

A bent pipe to which external force, such as an internal pressure and a bending moment, is applied singly or in combination, characterized in that the relationship among the outside diameter $D_0$ of the bent part, the radius of curvature R of the bent part, the outside diameter $D_0$ of the straight part, the wall thickness $T_0$ of the straight part, the central cross section angle $\phi$ of the bent part and the wall thickness t of the pipe, is in the range defined by the following equations (1) and (2):

$$\frac{D_0 - T_0}{2T_0} \geqq \frac{(D-t)\{4R + (D-t)\sin\phi\}}{4 \times t\{2R + (D-t)\sin\phi\}} \quad (1)$$

$$3T_0 \geqq t \quad (2)$$

whereby the bent pipe has a sectional form of high strength.

3 Claims, 6 Drawing Sheets

BENT PIPE HAVING SECTIONAL FORM OF HIGH STRENGTH

This application is a continuation of now abandoned application Ser. No. 07/727,342, filed on Jul. 8, 1991, which in turn is a continuation of abandoned application Ser. No. 07/483,301, filed on Feb. 21, 1990, which is in turn a continuation of abandoned application Ser. No. 07/196,195, filed as PCT/JP88/00008, Jan. 6, 1988.

TECHNICAL FIELD

This invention relates to a bent or curved pipe product having a dimension and a form such that the strength properties of its bend part are superior to those of its straight part in a piping where internal pressure and external force, such as a bending moment, are applied singly or in combination as a result of the operation of an apparatus, for example, in a chemical plant piping, a boiler piping or an atomic energy facility pipe arrangement.

BACKGROUND ART

Prior Art

The conventional bent pipes are prescribed in Japanese Industrial Standard Nos. B2311, B2312, etc. The pipe has been manufactured by attaching straight pipes 3 at weld portions 4 to weld-type fittings 2 (generally known as elbows) as shown in FIG. 2 and manufactured according to the Hamburg bending method as described in "Tekko binran (Steel Manual) VI," 3rd issue, page 179, edited by the Japanese Iron and Steel Institution. However, the configuration of the bent pipe product is limited to a bend part having a bend angle of up to 180°. Hence, the bent pipe product has had problems, such as an increase in welding man days at the time of pipe assembling, an increase in inspection man days for welded parts in accordance therewith, need of a longer construction period, and an increase in construction cost. Therefore, there has been a demand for a bent pipe comprising a bend part and straight parts integral with both ends thereof in order to decrease weld parts. As a proposal for manufacturing such a desirable bent pipe, Japanese Patent Laid-Open Nos. 24878/1974 and 135870/1978 disclose a processing method for an induction bent pipe 1 as shown in FIG. 1. This method has a drawback that the bend part always exhibits a yield starting internal pressure lower than that of the straight part, when the ratio ($R/D_0$) of bend radius, R, to straight part outside diameter, $D_0$, is in the range of 1 to 5 and when the ratio ($T_0/D_0$) of straight part wall thickness, $T_0$, to straight part outside diameter, $D_0$, is in the range of 0.02 to 0.20.

Problems to be Solved by the Invention

The present inventors have studied from the viewpoints of dimension and configuration whether or not the strength properties of a piping comprising this elbow are satisfactory when internal pressure and external force, such as a vending moment are applied singly or in combination, and picked up problems.

First, with respect to a piping comprising an elbow and straight pipes attached thereto with weld parts, the stress occurring on the outer surface of the pipe at each portion of the elbow was investigated when the internal pressure, P, reached 100 atm as a result of the application of a pressure to the inner surface of the piping by water pressure from an inlet 7 for water for internal pressure application fitted to an end face of the straight pipe, as shown in FIG. 3(a). Further, the internal pressure, P, was increased until the piping ruptured, and its characteristics were investigated. FIG. 4 shows stress occurring when the internal pressure, P, reached 100 atm. From the figure, it is apparent that the stress occurring is maximum at the inner circumference portion I ($\phi = -90$ deg.) of the elbow, presenting a dangerous cross section.

FIG. 3(a) shows the rupture conditions at a breaking point 5 of the piping. The rupture occurred in the neighborhood of the inner circumference portion I ($\phi = -90$ deg.) of the elbow (see FIG. 2(b). Therefore, it is seen that this portion has poor strength as compared with that at the outer circumference portion O ($\phi = +90$ deg.), and neutral portion N ($\phi = 0$ deg. and $\phi = 180$ deg.) of the elbow and at the straight pipe.

Next, with respect to a piping comprising an elbow and straight pipes attached thereto with weld parts, a bending moment was applied to the elbow by fixing one end of the straight pipe and applying external force 8 to the other end by means of a hydraulic jack as illustrated in FIG. 5(a). By this, the stress occurring on the outer surface of the pipe at each portion of the elbow was investigated.

FIG. 5(b) shows the stress occurring within the cross section of the elbow. Inner circumference portion I ($\phi = -90$ deg.), neutral portion N ($\phi = 0$ deg. and 180 deg.), and outer circumference portion O ($\phi = 90$ deg.) respectively exhibit ± peak stresses, thereby indicating that these four portions are dangerous cross sections. The reason was investigated, and it was found that the sectional form of the elbow was flattened by the application of a bending moment, thereby causing peak stresses to occur at the above-mentioned four portions.

From the foregoing, it has become apparent that when internal pressure and external force, such as bending moment, are applied singly or in combination to the conventional bent pipes, the elbow is inferior in strength properties to the straight pipe and that at that time, within the cross section of the elbow, the stresses at inner circumference portion I ($\phi = -90$ deg.), neutral portion N ($\phi = 0$ deg. and 180 deg.), and outer circumference portion O ($\phi = +90$ deg.) are great, especially indicating that inner circumference portion I ($\phi = -90$ deg.) is a dangerous portion. Accordingly, it has become apparent that an improvement must be made.

In view of the above current situation, the present invention has been made. An object of the present invention is to provide an elbowless steel pipe of high mechanical strength in which a smaller stress occurs even when internal pressure and external force, such as a bending moment are applied singly or in combination.

Figure 1A:
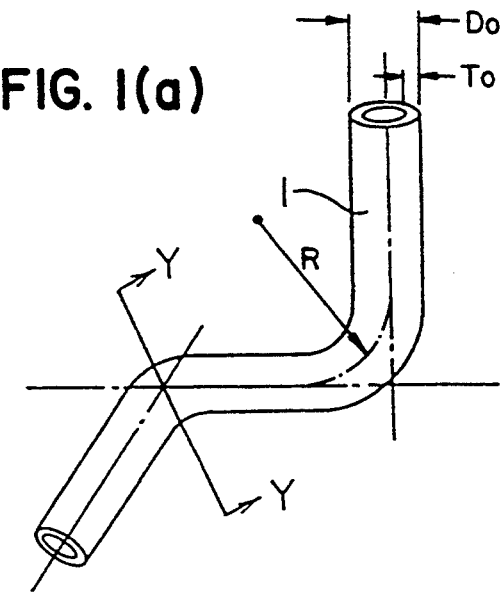
FIGS. 1(a) and (b) are respectively a schematic diagram of a piping comprising an elbowless pipe according to an embodiment of the present invention and a cross sectional view of the bend part taken in line Y—Y of FIG. 1(a)

DISCLOSURE OF THE INVENTION:

According to the present invention, there is provided a bent pipe to which internal pressure and external force, such as bending moment, is applied singly or in combination, characterized in that with respect to bend part outside diameter, D, bend part radius of curvature, R, straight part outside diameter, $D_0$, straight part wall thickness, $T_0$, and bend part central cross section angle, $\phi$, bend part wall thickness, t is in the range defined-by the following equations (1) and (2), thereby enabling the bent pipe to have a sectional form of high strength. Also, according to the present invention, there is provided an induction bent pipe for which with respect to straight part outside diameter, $D_0$, wall thickness, $T_0$, bend part maximum outside diameter, $D_1$, minimum outside diameter, $D_2$, bend radius, R, and wall thickness at bend part outer circumference (+90 deg.), $T_1$, the straight part wall thickness/outside diameter ratio $(T_0/D_0)$ is in the range defined by equation (5), (9), or (11), and bend radius, R, is in the range defined by equation (6) and to which internal pressure is applied, characterized in that wall thickness at bend part outer circumference (+90 deg.), $T_1$, is in the range defined by equation (3) and the degree of flattening of outside diameter at the bend part, U, said U being defined by equation (7) is in the range defined by equations (4), (8), or (10):

$$\frac{D_0 - T_0}{2T_0} \cong \frac{(D-t)\{4R + (D-t)\sin\phi\}}{4 \times t\{2R + (D-t)\sin\phi\}} \quad (1)$$

$$3T_0 \geq t \quad (2)$$
$$0 \leq \{(T_0 - T_1)/T_0\} * (R/D_0) \leq 0.20 \quad (3)$$
$$0 \leq U \leq 0.03 \quad (4)$$
$$0.04 \leq T_0/D_0 \leq 0.10 \quad (5)$$
$$1 \leq R/D_0 \leq 5 \quad (6)$$
$$U = 2 * (D_1 - D_2)/(D_1 + D_2) \quad (7)$$
$$0 \leq U \leq 0.05 \quad (8)$$
$$0.02 \leq T_0/D_0 < 0.04 \quad (9)$$
$$0 \leq U \leq 0.015 \quad (10)$$
$$0.10 < T_0/D_0 \leq 0.20 \quad (11)$$

Function

The present inventors have paid their attention to an elbowless pipe having a bend part of non-uniform wall thickness as shown in FIG. 1, which pipe has strength properties superior to those of a bent pipe comprising an elbow and have made studies.

That is, with the view of removing or relieving such drawbacks of the conventional piping system comprising an elbow, i.e., (a) occurrence of a maximum s tress at inner circumference portion I ($\phi = -90$ deg.) when internal pressure has been applied, and (b) occurrence of a peak stress due to the flattening of the bend part when bending moment has been applied, an elbowless pipe for which the basic design is to render the wall thickness at inner circumference portion I ($\phi = -90$ deg.) of the bend part of the elbowless pipe greater than that of an elbow has experimentally been fabricated.

Whether this elbowless pipe is superior in strength properties to the bent pipe comprising an elbow has been tested.

The stress occurring on the external surface of the pipe at the bend part of the elbowless pipe has been investigated when the internal pressure, P, reached 100 atm as a result of the application of a pressure to the internal surface of the piping of an elbowless pipe in the same manner as with an elbow. Further, the internal pressure, P, has been increased until the piping breaks, and its characteristics have been investigated.

Figure 4:
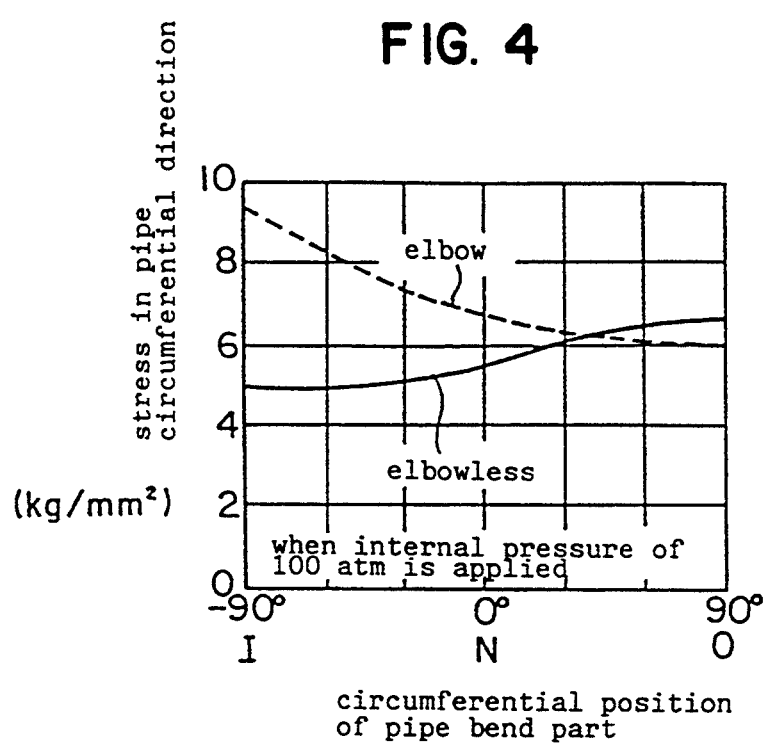
FIG. 4 is a graph of the stresses in the circumferential direction of a pipe occurring at the bend part of an elbowless pipe end and at the elbow when an internal pressure of 100 atm has been applied.

FIG. 4 shows the stress occurring when the internal pressure, P, reached 100 atm. The stress occurring at inner circumference portion I ($\phi = -90$ deg.) of the bend part, which has been a problem in the case of the conventional elbow, has markedly decreased, and uniformalization of the stress has been attained.

Figure 3A:
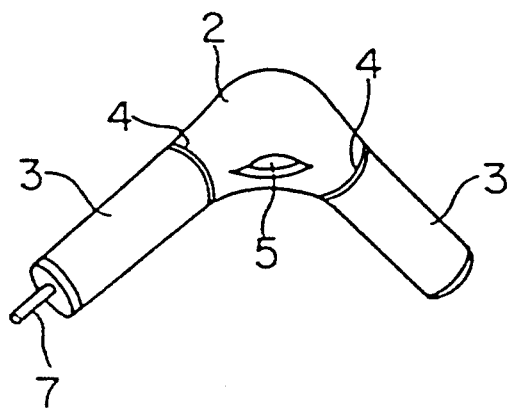
FIG. 3(a) is a perspective view of the rupture conditions of a piping comprising an elbow when internal pressure has been applied.
Figure 3B:
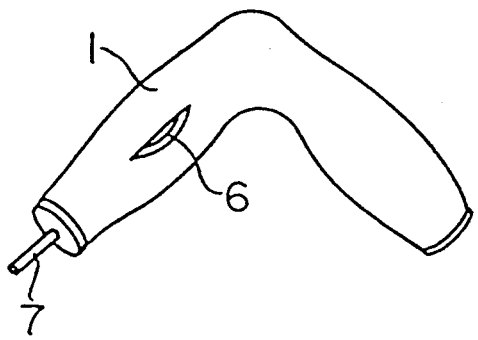
FIG. 3(b) is a perspective view of the rupture conditions of an elbowless pipe when internal pressure has been applied.

FIG. 3(b) shows the rupture conditions of the piping. Rupture has not occurred at the bend part of the elbowless pipe. As is shown by a rupture portion 6 in the drawing, rupture has occurred at the straight part only.

From the foregoing, it has become apparent that with respect to the elbowless pipe, the bend parts are superior in internal pressure strength properties to the straight parts and that accordingly the elbowless pipe is much superior to the elbow.

On the other hand, there has been no established estimation equation with respect to the stress occurring in bent pipes having non-uniform wall thickness such as this elbowless pipe. The present inventors have worked out the following equation (12), which has been applied to an elbowless pipe and found to be well in agreement with the measured values of FIG. 4. The values from equation (12) have also been well in agreement with the theoretical stress analysis results according to the finite element method. Moreover, it has been found that the stress occurring at the straight part can be expressed by equation (13).

Stress in circumferential direction at the bend part:

$$\sigma = \frac{P(D-t)\{4R + (D-t)\sin\phi\}}{4t\{2R + (D-t)\sin\phi\}} \quad (12)$$

Stress in circumferential direction at the straight part:

$$\sigma = \frac{P(D_0 - T_0)}{2T_0} \quad (13)$$

Next, the stress occurring at each portion of the bend part which when a bending moment has been applied to an elbowless pipe as in the case of the elbow has been investigated.

Figure 5A:
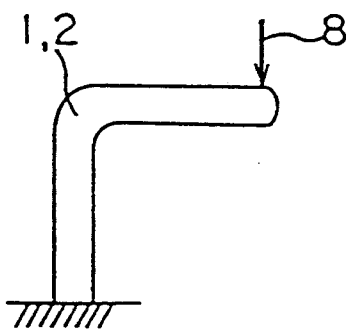
FIG. 5(a) is a schematic diagram illustrating how to apply a bending moment to a piping.
Figure 5B:
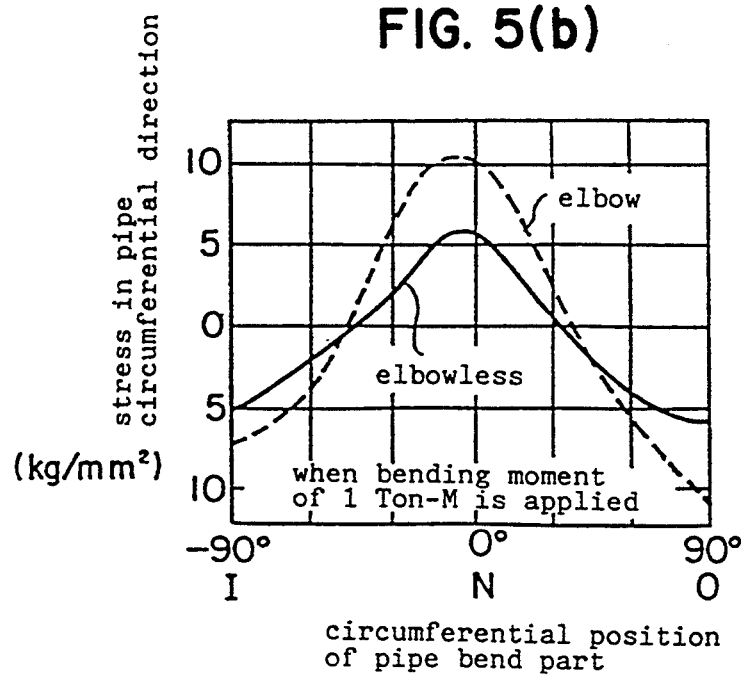
FIG. 5(b) is a graph of the stresses in the circumferential direction of a pipe occurring at the bend part when a bending moment of 1 Ton-M has been applied to an elbowless pipe and to a piping comprising an elbow.

The results are shown in FIG. 5(b) in comparison with those of the elbow. It has been found that the peak stress due to the flattening of the sectional form occurring at each of the inner circumference portion I ($\phi = -90$ deg.), neutral portion N ($\phi = 0$ deg. and 180 deg.), and outer circumference portion O ($\phi = +90$ deg.) of the conventional elbow is decreased to a great extent.

Figure 1B:
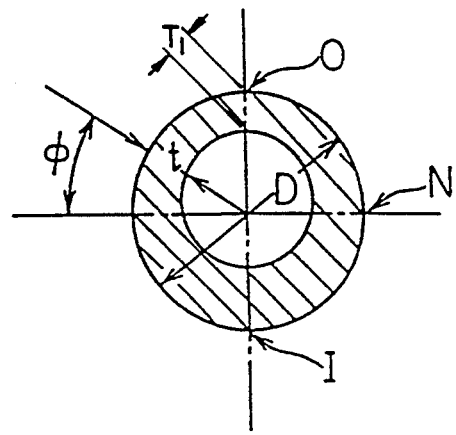
Figure 2A:
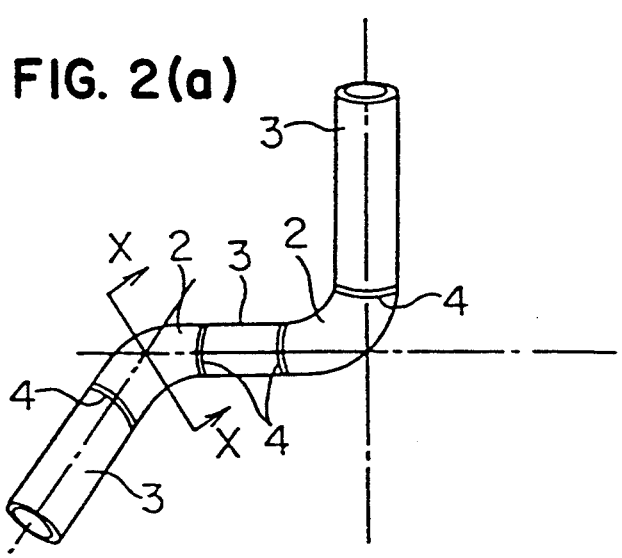
FIGS. 2(b) and (b) are respectively a schematic diagram of piping comprising a conventional weld-type fitting (generally known as an elbow) and a cross sectional view of the elbow part taken on line X—X of FIG. 2(a)
Figure 2B:
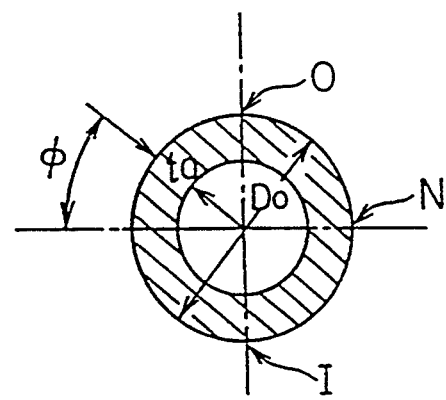

As expected in the beginning, this is believed to be due to the fact that the presence of a large wall thickness at inner circumference portion I ($\phi = -90$ deg.) of the elbowless pipe as shown in FIG. 1(b) prevents the cross section of the bend part of the elbowless pipe from being flattened, thereby remarkably reducing the stress.

From the foregoing, it has become apparent that an increase in the wall thickness at inner circumference portion I ($\phi = -90$ deg.) of the bend part of the pipe leads to a remarkable improvement in the strength properties of the piping system. Further investigation has been made as to a minimum wall thickness needed at each portion of the pipe.

Equation (14) has been established for the condition that "the bend part has a dimension and form so as to enable the same to have more excellent internal pressure strength properties than the straight part" in order to provide an elbowless pipe having excellent strength.

$$\text{stress occurring at the straight part} \geq \text{stress occurring at the bend part} \quad (14)$$

Substituting equation (13) for the left side of equation (14) and equation (12) for the right side thereof leads to equation (1), thereby enabling a minimum wall thickness required to be determined.

$$\frac{D_0 - T_0}{2T_0} \geq \frac{(D-t)\{4R + (D-t)\sin\phi\}}{4t\{2R + (D-t)\sin\phi\}} \quad (1)$$

In equation (1), only the strength with respect to internal pressure is considered. Since the wall thickness is large at inner circumference portion I ($\phi = -90$ deg.), for the above-mentioned reason, the stress is decreased during the application of bending moment as well, as compared with that of the elbow. Therefore, high safety is ensured.

The upper limit of the wall thickness has been considered. A large wall thickness is preferred from the viewpoint of stress relieving and hence safety. However, since the outside diameter generally has a predetermined value, the increase in wall thickness leads to a decrease in inside pipe diameter. Consequently, when the fluid moves in the pipe, the intrapipe flow velocity increases, thereby disadvantageously increasing flow resistance in the pipe. Further, this is accompanied by economic disadvantages. Therefore, equation (2) has been set for the upper limit of the wall thickness.

$$3T_0 \geq t \quad (2)$$

Figure 6A:
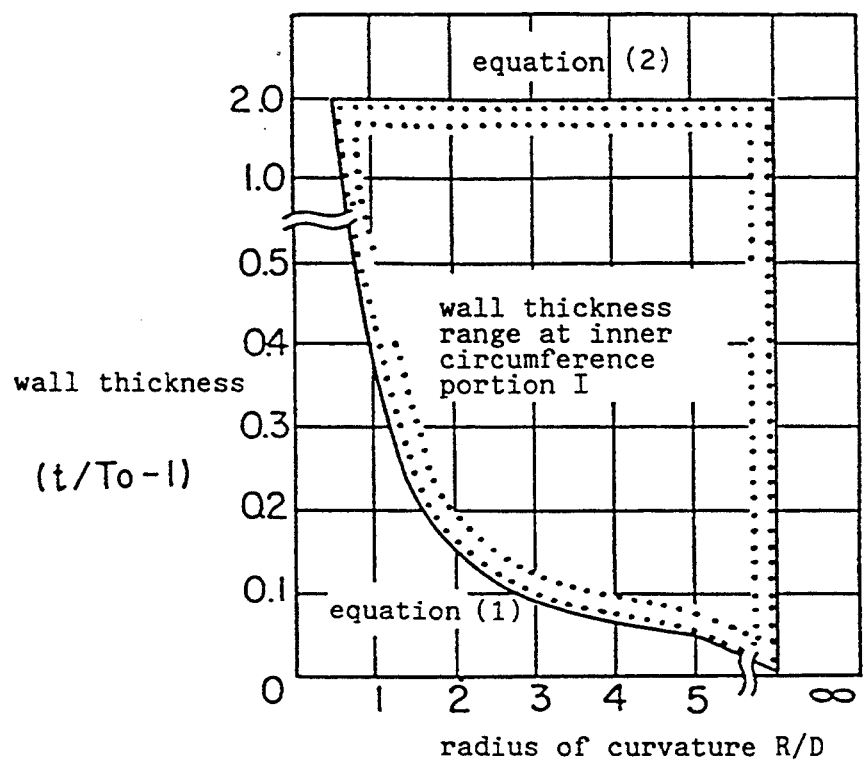
FIGS. 6(a) and 6(b) are graphs of examples of a calculation for the cross section contour of the bend part of an elbowless pipe, FIG. 6(a) being a graph indicating the well thickness, $(t/T_0-1)$, at inner circumference portion I ($\phi = -90$ deg.) and FIG. 6(b) being a graph indicating the wall thickness, $(t/T_0-1)$, at outer circumference portion O ($\phi = +90$ deg.)
Figure 6B:
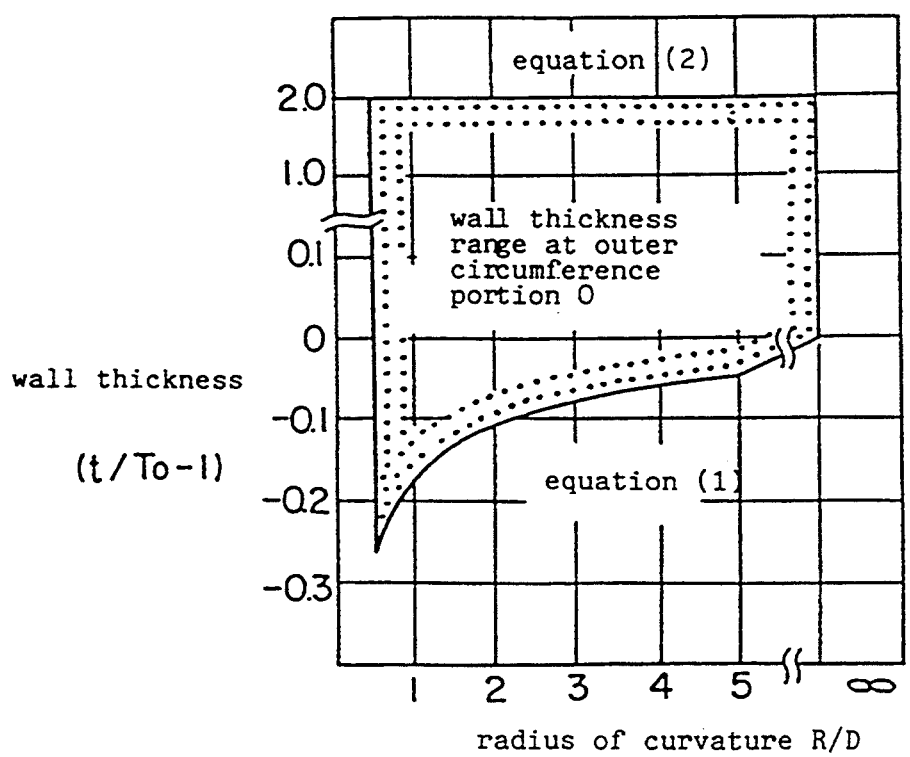

Some calculation results for the bend part of an elbowless pipe as defined by equations (1) and (2), with respect to the wall thickness range at each of inner circumference portion I ($\phi = -90$ deg.) and outer circumference portion O ($\phi = +90$ deg.), are shown in FIG. 6 in relation to the radius of curvature ratio R/D of the bend part. The smaller the radius of curvature ratio R/D of the piping, the greater the required wall thickness at inner circumference portion I ($\phi = -90$ deg.). At outer circumference portion O ($\phi = +90$ deg.), it has been found that the wall thickness can be decreased to some extent. Accordingly, the ranges of a novel elbowless pipe have been clarified. Since the outside diameter at the bent part, D, appearing in the equation is equal to $D_0$ in the general piping, it is assumed that $D = D_0$. The wall thickness at the straight part, $T_0$, represents an actual dimension. The maximum of the radius of curvature ratio, R/D, for the chemical plant piping, boiler piping and atomic energy facility pipe arrangement is generally 5 or so, and its minimum is generally 1.

With respect to induction bent pipes having varying flattening degrees at the bend part as shown in Table 1, investigation was made of the stress occurring on the external surface of the pipe at each position of the pipe when the internal pressure reached 100 atm as a result of application of pressure to the end of the pipe by water pressure from the inlet for internal pressure application.

TABLE 1

| | | Straight Part | | | Bend Part | | | | Maximum Stress |
|---|---|---|---|---|---|---|---|---|---|
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree U (%) | at the Bend Part under the Internal Pressure of 100 atm (kg/mm²) |
| 1 | ASTM A106B | 168.3 | 10.8 | 6.4 | 19.1 | 9.4 | 1.5 | 0.1 | 7.0 |
| 2 | ASTM | 168.3 | 10.9 | 6.5 | 18.4 | 10.1 | 1.5 | 2.0 | 8.3 |

TABLE 1-continued

| | | Straight Part | | | Bend Part | | | | Maximum Stress |
|---|---|---|---|---|---|---|---|---|---|
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree U (%) | at the Bend Part under the Internal Pressure of 100 atm (kg/mm²) |
| 3 | A106B ASTM A106B | 168.3 | 10.9 | 6.5 | 18.8 | 9.3 | 1.5 | 5.0 | 10.5 |

Figure 8:
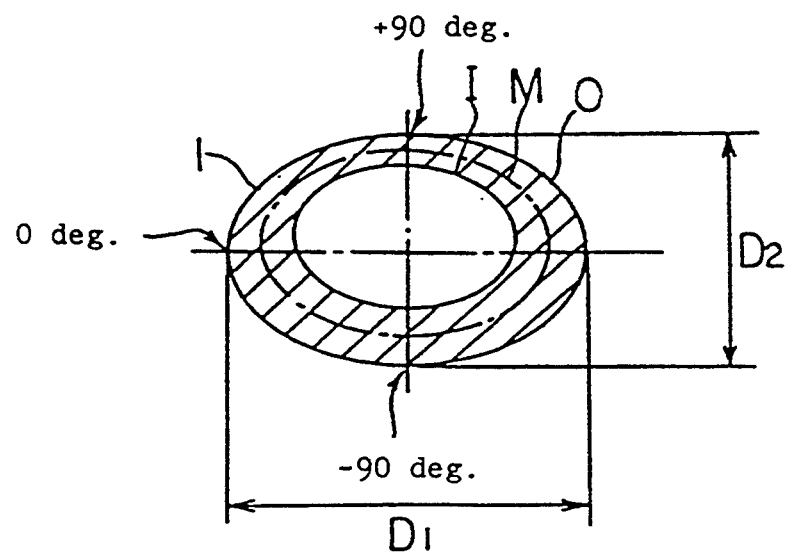
FIG. 8 is a cross-section for showing the flattening conditions of the bend part of an induction bent pipe taken on line Y—Y of FIG. 1(a)
Figure 9A:
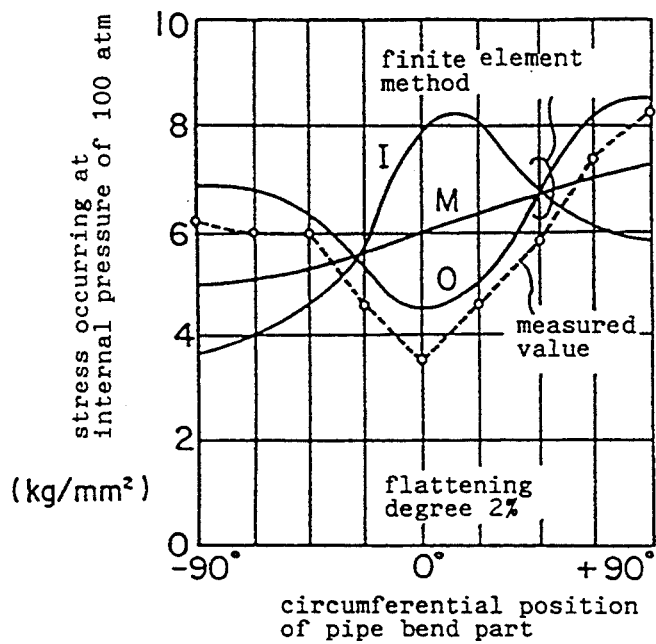
FIG. 9(a) is a graph indicating the measured values, together with the analytical values according to the finite element method, of the stresses occuring at the bend part of an induction bent pipe having a bend part flattening degree, U, of 2% when an internal pressure of 100 atm has been applied.
Figure 10:
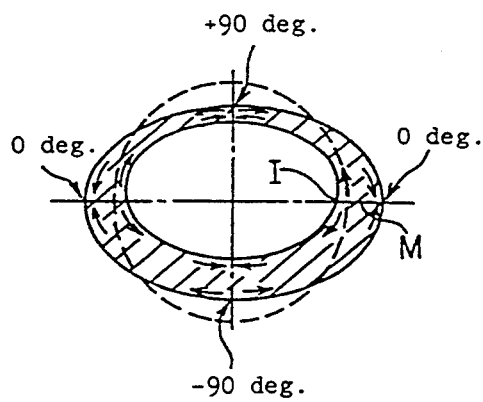
FIG. 10 is a conceptual diagram of the additional stress correcting the flattening when internal pressure has been applied to an induction bent pipe having a flattened bend part.
Figure 9B:
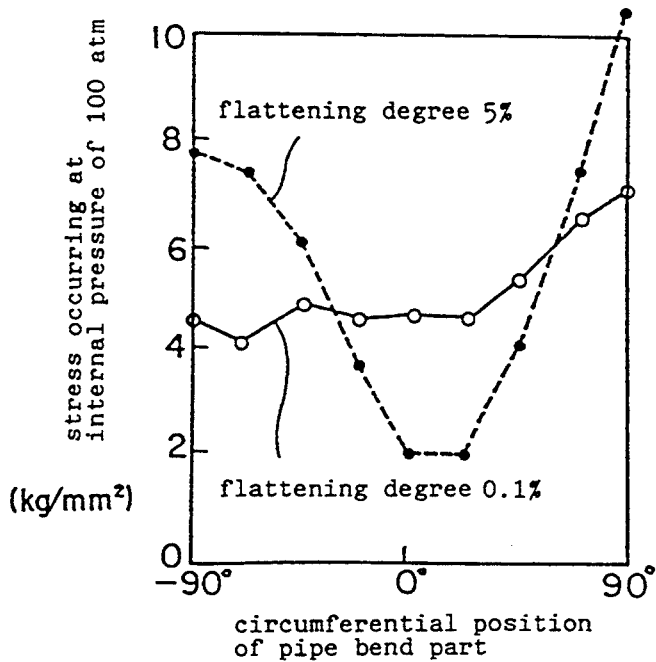
FIG. 9(b) is a graph indicating the measured values of the stresses occuring at the bend part when the bend part has varying degrees of flattening.

FIG. 9(a) shows some measured values of the stress occurring at external surface portion (O) of a bend part having a flattening degree of 2% when the internal pressure reaches 100 atm. FIG. 9(b) and Table 1 show the stress result at bend parts having varying degrees of flattening. As is apparent from the figure and table, a maximum stress at this external surface portion increases with the increase in the flattening degree, and outer circumference portion ($\phi = +90$ deg.) is a dangerous portion in terms of a maximum stress. Further, the numerical analysis results according to the finite element analytical method with respect to the phenomenon when an internal pressure of 100 atm has been applied to the induction bent pipe, together with the measured values, are shown in FIG. 9(a). As a result of the analysis, the stress at external surface portion (O) shown in FIG. 8 has been substantially the same as the above-mentioned measured values. Also, the stress conditions at wall thickness central portion (M) and at internal surface portion (I) have additionally been indicated. From these results, attention has been paid to the fact that the stress increase by flattening is due to the addition of a stress to correct the flattening which acts at each portion of the pipe when an internal pressure is applied to the flattened bend part. Also, attention has been paid to the fact that as shown in FIG. 10, additional tensile stress due to the stress to correct the flattening acts on outer circumference portion (+90 deg.) of the bend part, which additional tensile stress increases with the relative increase in the wall thickness. From the foregoing, when internal pressure is applied to an induction bent pipe, an increase in the flattening degree at the bend part leads to an increase in a maximum stress occurring at the circumference portion of the bent pipe. Further, when the wall thickness at the outer circumference portion, $T_1$, (+90 deg.) of the bent pipe is small, the stress occurring at this portion becomes large. This phenomenon is related to the ratio of straight part wall thickness to outside diameter ($T_0/D_0$).

With respect to induction bent pipes having varying wall thickness difference and varying flattening degree and manufactured by continuously heating a steel pipe having a straight part wall thickness/outside diameter ($T_0/D_0$) of from 0.04 to 0.10 by means of high frequency induction heating while applying bending moment to the heated portion thereof and, immediately thereafter, conducting forced cooling by water or air, yield tests have been conducted by applying internal pressure, thereby determining the effects of wall thickness difference and flattening degree. The results are shown in Table 2.

TABLE 2

| | | Dimention and Configuration | | | | | | | Position where Yield Starts Earliest (Mark X) | |
|---|---|---|---|---|---|---|---|---|---|---|
| | | Straight Part | | | Bend Part | | | | | |
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree U (%) | Straight Part | Bend Part |
| 1 | ASTM A106B | 168.3 | 10.8 | 6.4 | 19.1 | 9.4 | 1.5 | 0.1 | X | — |
| 2 | ASTM A106B | 168.3 | 11.0 | 6.5 | 13.4 | 10.6 | 3.0 | 0.9 | X | — |
| 3 | ASTM A106B | 168.3 | 7.2 | 4.3 | 12.1 | 6.6 | 1.5 | 1.1 | X | — |
| 4 | ASTM A106B | 168.3 | 10.9 | 6.5 | 18.4 | 10.1 | 1.5 | 2.0 | X | — |
| 5 | ASTM A106B | 168.3 | 11.0 | 6.5 | 16.2 | 10.3 | 2.0 | 2.5 | X | — |
| 6 | ASTM A106B | 168.3 | 7.2 | 4.3 | 10.6 | 6.6 | 2.0 | 2.0 | X | — |
| 7 | ASTM A106B | 168.3 | 10.9 | 6.5 | 18.8 | 9.3 | 1.5 | 5.0 | — | X |
| 8 | ASTM A106B | 168.3 | 11.2 | 6.6 | 18.4 | 10.1 | 1.5 | 3.5 | — | X |
| 9 | ASTM A106B | 168.3 | 7.1 | 4.2 | 9.0 | 6.7 | 3.0 | 3.3 | — | X |
| 10 | ASTM A106B | 168.3 | 11.2 | 6.5 | 13.4 | 10.5 | 3.0 | 2.9 | X | — |
| 11 | ASTM A106B | 168.3 | 7.1 | 4.2 | 10.6 | 6.6 | 2.0 | 1.4 | X | — |
| 12 | ASTM A106B | 168.3 | 11.0 | 6.5 | 18.5 | 9.1 | 1.5 | 1.8 | — | X |
| 13 | ASTM A106B | 168.3 | 10.9 | 6.5 | 15.4 | 9.4 | 2.0 | 3.0 | — | X |
| 14 | ASTM | 168.3 | 7.0 | 4.2 | 8.7 | 6.3 | 3.0 | 2.5 | — | X |

TABLE 2-continued

| | | Dimention and Configuration | | | | | | | Position where Yield Starts Earliest (Mark X) | |
|---|---|---|---|---|---|---|---|---|---|---|
| | | Straight Part | | | Bend Part | | | | | |
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree $U$ (%) | Straight Part | Bend Part |
| | A106B | | | | | | | | | |

As a result, it has been observed that yield starts at the bend part when the flattening degree, U, is more than 3% and when even if the flattening degree, U, is 3% or less, the wall thickness at outer circumference portion, $T_1$, (+90 deg.) of the bend part is relatively small. A summary of these relationships in relation to $R/D_0$ is shown in FIG. 7. In the figure, the · mark indicates first yield occurrence at the straight part, and the x mark indicates first yield occurrence at the bend part. In the figure, the numerals indicate the flattening degree of outside diameter (%) of the bend part.

As mentioned above, in order to ensure the safety of the bend part when internal pressure has been applied to an induction bent pipe having a bend part of non-uniform wall thickness, the relationship of equation (1) must be satisfied. From equation (1), particularly when the bend part bend radius, $R/D_0$, is in the range of 1 to 5 and when $T_0/D_0$ is in the range of 0.02 to 0.20, the limit of the wall thickness $T_1$ at outer circumference portion (+90 deg.) of the bend part is approximately expressed by equation (15):

$$\{(T_0-T_1)/T_0\}* (R/D_0)=0.20 \quad (15)$$

Moreover, the present inventors have experimentally fabricated induction bent pipes having various wall thickness difference and various flattening degree as indicated in Tables 3 and 4 by continuously heating a steel pipe by means of high frequency induction heating while applying a bending moment to the heated portion thereof and, immediately thereafter, conducting forced cooling by water or air. The induction bent pipes have been subjected to a yield test in which internal pressure has been applied thereto, thereby determining the effects of wall thickness difference and flattening degree.

TABLE 3

| | | Dimention and Configuration | | | | | | | Position where Yield Starts Earliest (Mark X) | |
|---|---|---|---|---|---|---|---|---|---|---|
| | | Straight Part | | | Bend Part | | | | | |
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree $U$ (%) | Straight Part | Bend Part |
| 1 | ASTM A106B | 165.1 | 5.5 | 3.3 | 7.4 | 5.1 | 2.0 | 2.0 | X | — |
| 2 | ASTM A106B | 165.1 | 5.4 | 3.3 | 7.2 | 4.9 | 2.0 | 3.3 | X | — |
| 3 | ASTM A106B | 165.1 | 5.4 | 3.3 | 7.5 | 5.0 | 2.0 | 5.0 | X | — |
| 4 | ASTM A106B | 165.1 | 5.6 | 3.4 | 7.6 | 5.2 | 2.0 | 5.9 | — | X |
| 5 | ASTM A106B | 165.1 | 5.5 | 3.4 | 7.5 | 4.8 | 2.0 | 2.5 | — | X |
| 6 | ASTM A106B | 165.1 | 5.5 | 3.3 | 7.4 | 5.0 | 2.0 | 5.3 | — | X |

TABLE 4

| | | Dimention and Configuration | | | | | | | Position where Yield Starts Earliest (Mark X) | |
|---|---|---|---|---|---|---|---|---|---|---|
| | | Straight Part | | | Bend Part | | | | | |
| No. | Type of Steel | Outside Diameter $D_0$ (mm) | Wall Thickness $T_0$ (mm) | $T_0/D_0$ (%) | Inner Circumference Wall Thickness $T_2$ (mm) | Outer Circumference Wall Thickness $T_1$ (mm) | Bend Radius $R/D_0$ | Flattening Degree $U$ (%) | Straight Part | Bend Part |
| 1 | ASTM A106B | 139.7 | 15.9 | 11.4 | 21.1 | 14.6 | 2.0 | 0.5 | X | — |
| 2 | ASTM A106B | 139.7 | 15.7 | 11.2 | 22.0 | 14.8 | 2.0 | 0.8 | X | — |
| 3 | ASTM A106B | 139.7 | 16.0 | 11.5 | 21.8 | 14.4 | 2.0 | 1.5 | X | — |
| 4 | ASTM A106B | 139.7 | 15.9 | 11.4 | 21.5 | 14.6 | 2.0 | 2.3 | — | X |
| 5 | ASTM A106B | 139.7 | 15.8 | 11.3 | 21.3 | 14.0 | 2.0 | 0.9 | — | X |
| 6 | ASTM A106B | 139.7 | 16.1 | 11.5 | 20.9 | 13.8 | 2.0 | 2.5 | — | X |

The characteristics of these induction bent pipes are apparent from the foregoing tables. The straight part wall thickness, $T_0/D_0$, is in the range of 2 to less than 4% in Table 3 and in the range of more than 10 to 20% in Table 4. The bend part bend radius, $R/D_0$, is in the range of 1 to 5, the flattening degree is in the range of 0 to 10%, and where the wall thickness at the bend part outer circumference (+90 deg.) is $T_1$, $(T_0-T_1)/T_0$ is in the range of 0 to 0.2.

Benefits of the Invention

The piping comprising an elbowless pipe of the present invention has excellent strength properties when subjected to internal pressure and bending moment, as compared with those of the conventional piping comprising an elbow. Moreover, since the cross section flattening is small, the present elbowless pipe can be employed in these piping such as those for a chemical plant, a boiler, and an atomic energy facility where external force, such as internal pressure and bending moment is applied singly or in combination during the operation of such equipment. The present elbowless pipe will improve the safety of such equipment and in that way greatly contribute to the industry.

BEST MODE FOR CARRYING OUT THE INVENTION

EXAMPLE 1

Elbowless pipes having various dimensions defined by equations (1) and (2) which are indicated in Tables 5 and 6 were manufactured, and these were subjected to a break-down test in which an internal pressure was applied and to a stress test in which a bending moment was applied. Table 5 indicates rupture conditions when an internal pressure is applied as working examples. Table 6 indicates stress conditions, in comparison with those of the elbow, when a bending moment of 1 Ton-M is applied as working examples.

1) Break-down test by internal pressure:

The break-down test of piping was carried out by applying a pressure to the internal surface of the pipe with the water pressure as mentioned hereinbefore (FIG. 3(b)). The results are shown in Table 5.

With respect to all of the elbowless pipes, burst rupture occurred at the straight part thereof. From this, the safety of the bend part has been confirmed and that it has become apparent that the present elbowless pipe has a sectional form with excellent strength properties with respect to internal pressure, as compared with the conventional elbow.

TABLE 5

| Type of Product | No. | Outside Diameter D,Do | Wall Thickness t $\phi = -90$ | Wall Thickness t $\phi = +90$ | $T_0$ | Radius of Curvature R | Bend Part I | Bend Part N | Bend Part O | Straight Part |
|---|---|---|---|---|---|---|---|---|---|---|
| Examples of the | 1 | 168.3 | 12.1 | 6.6 | 7.1 | 1.5D | O | O | O | X |
| Present Invention: | 2 | 168.3 | 10.6 | 6.6 | 7.1 | 2.0D | O | O | O | X |
| Elbowless Pipes | 3 | 168.3 | 9.0 | 6.8 | 7.1 | 3.0D | O | O | O | X |
|  | 4 | 168.3 | 18.5 | 10.3 | 11.0 | 1.5D | O | O | O | X |
|  | 5 | 168.3 | 16.2 | 10.4 | 11.0 | 2.0D | O | O | O | X |
|  | 6 | 168.3 | 12.8 | 10.4 | 11.0 | 3.0D | O | O | O | X |
| Conventional Example: Elbow | 7 | 168.3 | 10.5 | 10.5 | 10.5 | 1.4D | X | O | O | O |

The mark X indicates rupture position due to internal pressure, and the mark O indicates non-rupture position.

2) Stress test by bending moment:

A test was conducted in substantially the same manner as that mentioned hereinbefore (FIG. 5(a)). The stress occurring at neutral position N, as a representative example of the positions at which a peak stress is observed on the cross sectional surface, is shown in FIG. 6.

TABLE 6

| Type of Product | No. | Outside Diameter D,Do | Wall Thickness t $\phi = -90$ | Wall Thickness t $\phi = +90$ | $T_0$ | Radius of Curvature R | Comparison of Stress at Neutral Portion N in Pipe Circumferential Direction when Bending Moment of 1 Ton-M Has Been Applied to the Bend Part (1 for Elbow) |
|---|---|---|---|---|---|---|---|
| Examples of the | 4 | 168.3 | 18.5 | 10.3 | 11.0 | 1.5D | 0.55 |
| Present Invention: | 5 | 168.3 | 16.2 | 10.4 | 11.0 | 20.D | 0.54 |
| Elbowless Pipes | 6 | 168.3 | 12.8 | 10.4 | 11.0 | 3.0D | 0.46 |
| Conventional Examples: Elbow | 7 | 168.3 | 10.5 | 10.5 | 10.5 | 1.4D | 1.00 |

A remarkable stress reduction was observed with all of the elbowless pipes as compared with the elbow type pipe. This has demonstrated the effectiveness of the presence of a large wall thickness at inner circumference portion I of the elbowless pipe.

From the test results in 1) and 2) above, it has been confirmed that all of the elbowless pipes according to the present invention have excellent strength properties as compared with the conventional elbow type pipe and that the bend part is superior to the straight part in the mechanical strength with respect to internal pressure.

EXAMPLE 2

Figure 7A:
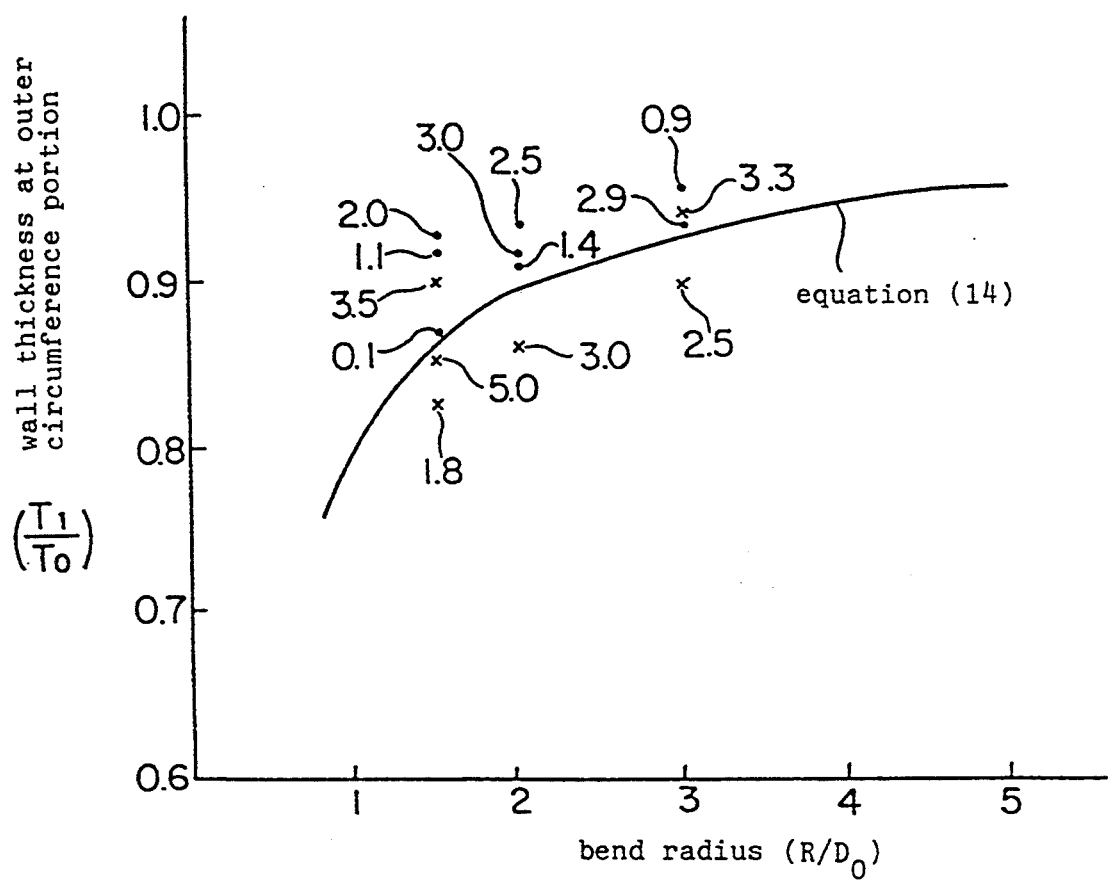
FIGS. 7(a)–7(c) are graphs indicating the yield conditions produced by internal pressure in an induction bent pipe having varying degrees of flattening, U, and varying outer circumference portion (+90 deg.) wall thickness, $T_1$, at the bend part of the pipe according to an embodiment of the present invention, FIG. 7(a) being a graph for the case of $0.04 \leq T_0/D_0 \leq 0.10$, FIG. 7(b) being a graph for the case of $0.02 \leq T_0/D_0 < 0.04$, FIG. 7(c) being a graph for the case of $0.10 < T_0/D_0 \leq 0.20$.

1) The Test Results in the Case of $0.04 \leq T_0/D_0 \leq 0.10$ are shown in FIG. 7(a)

When the flattening degree, U, is greater than 3% and when even if the flattening degree is 3% or less, and the wall thickness, $T_1$, at outer circumference portion (+90 deg.) of the bend part is relatively small, it has been found that yield starts at the bend part. The limiting curve of the wall thickness, $T_1$, at outer circumferential portion (+90 deg.) in the bend part of a pipeline of which the straight part yields under the condition of a flattening degree of 3% or less has been substantially in agreement with equation (14). That is, it has been demonstrated that in the case of any induction bent pipes characterized in that the wall thickness, $T_1$, at the outer circumference portion (+90 deg.) of the bend part and the outside diameter flattening degree, U, of the bend part are respectively in the range defined by equations (3) and (4) when an internal pressure has been applied to the induction bent pipe, the yield starting internal pressure of the bend part is greater than that of the straight part, thereby ensuring the safety of the bent pipes. Also, it has been demonstrated that the induction bent pipes of the present invention having a slightly flattened sectional form at the bend part thereof have excellent mechanical strength with respect to internal pressure, as compared with the straight part.

Figure 7B:
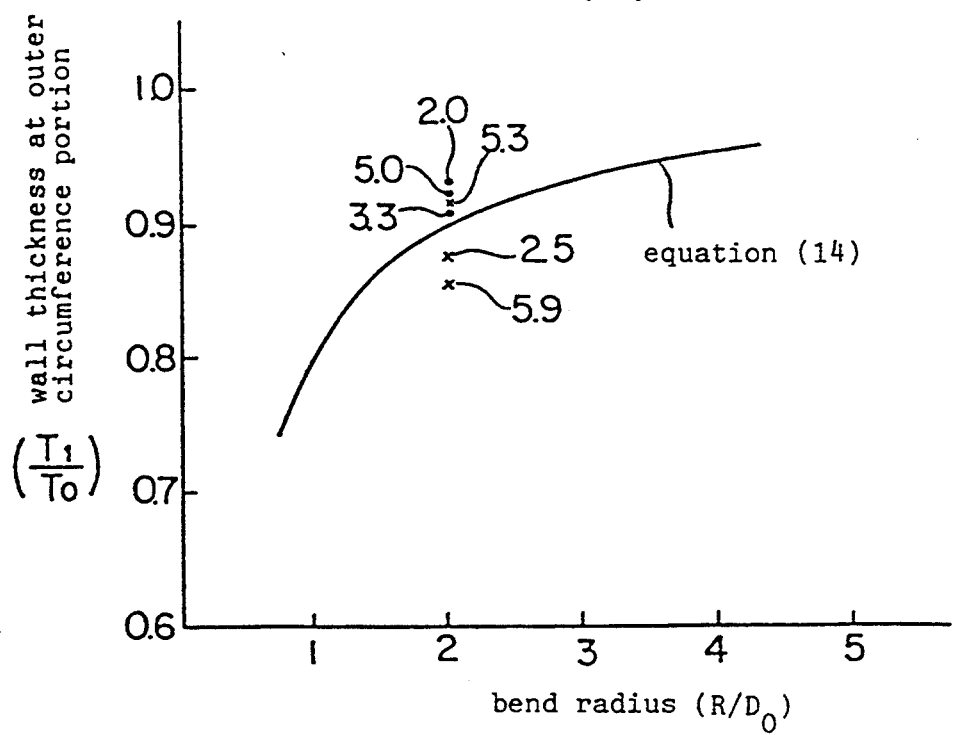

2) The test Results in the Case of $0.02 \leq T_0/D_0 < 0.04$ are shown in FIG. 7(b).

When the flattening degree, U, is greater than 5% and even if the flattening degree is 5% or less, and the wall thickness, $T_1$, at outer circumference portion (+90 deg.) of the bend part is relatively small, it has been found that yield starts at the bend part. Moreover, as in the preceding case, the limiting line of the wall thickness, $T_1$, at outer circumference portion (+90 deg.) in the bend part of a piping of which the straight part yields under the condition of a flattening degree of 5% or less has been in agreement with equation (14) (FIG. 7(b)).

That is, it has been demonstrated that in the case of any induction bent pipes characterized in that the wall thickness, $T_1$, at outer circumference portion (+90 deg.) of the bend part and the outside diameter flattening degree, U, of the bend part are respectively in the ranges defined by equations (3) and (8) when an internal pressure has been applied to the induction bent pipe, the yield starting internal pressure of the bend part is greater than that of the straight part, thereby ensuring the safety of the bent pipes. Also, it has been demonstrated that the induction bent pipes of the present invention having a slightly flattened sectional form at the bend part thereof have excellent mechanical strength with respect to internal pressure, as compared with the straight part.

Figure 7C:
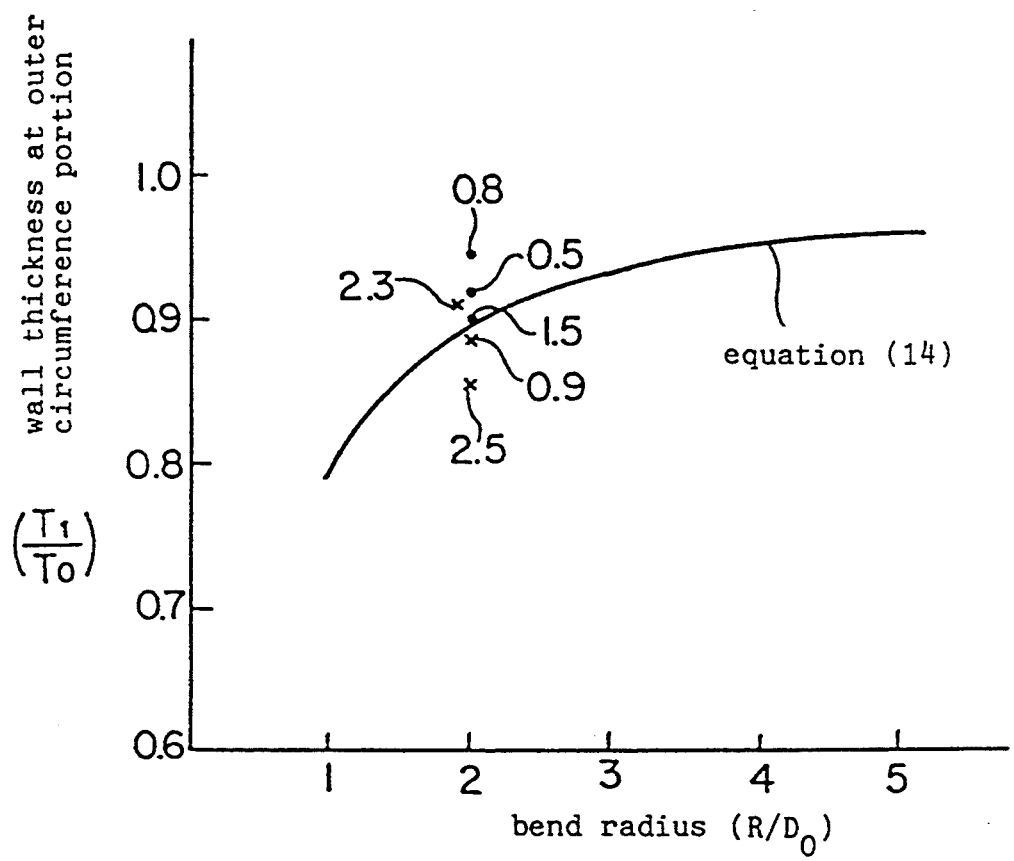

3) The Test Results in the Case of $0.10 < T_0/D_0 \leq 0.20$ are shown in FIG. 7(c).

When the flattening degree, U, is greater than 1.5% and even if the flattening degree is 1.5% or less, and the wall thickness, $T_1$, at outer circumferential portion (+90 deg.) of the bend part is relatively small, it has been found that yield starts at the bend part. Moreover, as in preceding case, the limiting line of the wall thickness $T_1$ at outer circumference portion (+90 deg.) in the bend part of a pipeline of which the straight part yields under the condition of a degree of compression of 1.5% or less has been in agreement with equation (14) (FIG. 7(c)).

That is, it has been demonstrated that in the case of any induction bent pipes characterized in that the wall thickness, $T_1$, at outer circumference portion (+90 deg.) of the bend part and the outside diameter flattening degree, U, of the bend part are respectively in the ranges defined by equations (3) and (10) when an internal pressure has been applied to the induction bent pipe, the yield starting internal pressure of the bend part is greater than that of the straight part, thereby ensuring the safety of the bent pipes. Also, it has been demonstrated that the induction bent pipes of the present invention having a slightly flattened sectional form at the bend part thereof have excellent strength properties with respect to internal pressure, as compared with the straight part.

The wall thicknesses at other portions of the bend part are nearly uniquely determined based on the bend radius, R, and the wall thickness, $T_1$, at outer circumference portion (+90 deg.) of the bend part, because of the manufacturing method of the induction bent pipe. For example, generally, $(T_2-T_0)/T_0$ wherein $T_2$ represents the wall thickness at inner circumference portion (−90 deg.) of the bend part is in the range of 0.07 to 0.80. In addition, the outside diameter flattening degree, U, of the bend part inevitably results from the manufacturing method of the induction bent pipe. While various countermeasures have been tried, it is difficult to completely eliminate this problem. Unless a special measure for outside diameter correction is taken after high frequency induction bending work, the flattening degree is generally up to 8% or so.

We claim:

1. A bent pipe to which an internal pressure is to be applied and having a high strength for resisting internal pressure of a fluid flowing therethrough, said bent pipe having a straight part with an outside diameter and a uniform wall thickness, and a bent part extending from at least one end of said straight part and having an outside diameter and a wall thickness and having a maximum outside diameter, a minimum outside diameter, a radius of bending curvature, and a wall thickness at the radially outermost part of the circumference of the cross-section thereof, said bent pipe having a ratio of the wall thickness of the straight part to the outside diameter thereof in the range as defined by the following equation (5) and the radius of bending curvature in the range defined by the following equation (6), and a degree of flattening of the outside diameter of the bent part as defined by the following equation (7) and which is in a range as defined by the following equation (4), and said wall thickness at the radially outermost part of the circumference of the bend being in the range as defined by the following equation (3):

$$\frac{D_0 - T_0}{2T_0} \geq \frac{(D - t)\{4R + (D - t)\sin\phi\}}{4 \times t\{2R + (D - t)\sin\phi\}} \quad (1)$$

$$3T_0 \geq t \quad (2)$$

$$0 \leq \{(T_0 - T_1)/T_0\} * (R/D_0) \geq 0.20 \quad (3)$$

$$0 \leq U \leq 0.03 \quad (4)$$

$$0.04 \leq T_0/D_0 \leq 0.10 \quad (5)$$

$$1 \leq R/D_0 \leq 5 \quad (6)$$

$$U = 2 * (D_1 - D_2)/(D_1 + D_2) \quad (7)$$

wherein $D_0$ is the outside diameter of the straight part;
$T_0$ is the wall thickness of the straight part;
D is the outside diameter of the bent part at a given angle $\phi$;

t is the wall thickness of the bent part at a given angle $\phi$;

R is the radius curvature of the bent part; $\phi$ is an angle in a plane perpendicular to the central longitudinal axis of the bent part and measured from a diametral line in said plane perpendicular to a further diametral line in said plane and extending on the radius of curvature of the bent part, $\phi$ being equal to $-90°$ at a point where said further diametral line crosses the bent part at the inside of the curvature thereof and being equal to $+90°$ at a point where said further diametral line crosses the bent part at the outside of the curvature thereof;

$T_1$ is the wall thickness at $\phi = +90°$;

U is the degree of flattening of the outside diameter of the bent part;

$D_1$ is the minimum outside diameter of the bent part;

$D_2$ is the maximum outside diameter of the bent part; and $T_0 - 0.5 \text{mm} > T_1$;

the tensile strength $TS_0$ of the wall thickness $T_0$ of the straight pipe part and the tensile strength $TS_1$ of the wall thickness t of the bent part throughout all said bent part satisfying the condition:

$$TS_0 \leq TS_1.$$

2. A bent pipe to which an internal pressure is to be applied and having a high strength for resisting internal pressure of a fluid flowing therethrough, said bent pipe having a straight part with an outside diameter and a uniform wall thickness, and a bent part extending from at least one end of said straight part and having an outside diameter and a wall thickness and having a maximum outside diameter, a minimum outside diameter, a radius of bending curvature, and a wall thickness at the radially outermost part of the circumference of the cross-section thereof, said bent pipe having a ratio of the wall thickness of the straight part to the outside diameter thereof in the range as defined by the following equation (9) and the radius of bending curvature in the range defined by the following equation (6), and a degree of flattening of the outside diameter of the bent part as defined by the following equation (7) and which is in a range as defined by the following equation (8), and said wall thickness at the radially outermost part of the circumference of the bend being in the range as defined by the following equation (3):

$$\frac{D_0 - T_0}{2T_0} \geq \frac{(D - t)\{4R + (D - t)\sin \phi\}}{4 \times t\{2R + (D - t)\sin \phi\}} \quad (1)$$

$$3T_0 \geq t \quad (2)$$
$$0 \leq \{(T_0 - T_1)/T_0\} * (R/D_0) \leq 0.20 \quad (3)$$
$$0 \leq U \leq 0.05 \quad (8)$$
$$0.02 \leq T_0/D_0 < 0.04 \quad (9)$$
$$1 \leq R/D_0 \leq 5 \quad (6)$$
$$U = 2 * (D_1 - D_2)/(D_1 + D_2) \quad (7)$$

wherein $D_0$ is the outside diameter of the straight part;

$T_0$ is the wall thickness of the straight part;

D is the outside diameter of the bent part at a given angle $\phi$;

t is the wall thickness of the bent part at a given angle $\phi$;

R is the radius curvature of the bent part; $\phi$ is an angle in a plane perpendicular to the central longitudinal axis of the bent part and measured from a diametral line in said plane perpendicular to a further diametral line in said plane and extending on the radius of curvature of the bent part, $\phi$ being equal to $-90°$ at a point where said further diametral line crosses the bent part at the inside of the curvature thereof and being equal to $+90°$ at a point where said further diametral line crosses the bent part at the outside of the curvature thereof;

$T_1$ is the wall thickness at $\phi = +90°$;

U is the degree of flattening of the outside diameter of the bent part;

$D_1$ is the minimum outside diameter of the bent part;

$D_2$ is the maximum outside diameter of the bent part; and $T_0 - 0.5 \text{mm} > T_1$;

the tensile strength $TS_0$ of the wall thickness $T_0$ of the straight pipe part and the tensile strength $TS_1$ of the wall thickness t of the bent part throughout all said bent part satisfying the condition:

$$TS_0 \leq TS_1.$$

3. A bent pipe to which an internal pressure is to be applied and having a high strength for resisting internal pressure of a fluid flowing therethrough, said bent pipe having a straight part with an outside diameter and a uniform wall thickness, and a bent part extending from at least one end of said straight part and having an outside diameter and a wall thickness and having a maximum outside diameter, a minimum outside diameter, a radius of bending curvature, and a wall thickness at the radially outermost part of the circumference of the cross-section thereof, said bent pipe having a ratio of the wall thickness of the straight part to the outside diameter thereof in the range as defined by the following equation (11) and the radius of bending curvature in the range defined by the following equation (6), and a degree of flattening of the outside diameter of the bent part as defined by the following equation (7) and which is in a range as defined by the following equation (10), and said wall thickness at the radially outermost part of the circumference of the bend being in the range as defined by the following equation (3):

$$\frac{D_0 - T_0}{2T_0} \geq \frac{(D - t)\{4R + (D - t)\sin \phi\}}{4 \times t\{2R + (D - t)\sin \phi\}} \quad (1)$$

$$3T_0 \geq t \quad (2)$$
$$0 \leq \{(T_0 - T_1)/T_0\} * (R/D_0) \leq 0.20 \quad (3)$$
$$0 \leq U \leq 0.015 \quad (10)$$
$$0.10 < T_0/D_0 \leq 0.20 \quad (11)$$
$$1 \leq R/D_0 \leq 5 \quad (6)$$
$$U = 2 * (D_1 - D_2)/(D_1 + D_2) \quad (7)$$

wherein $D_0$ is the outside diameter of the straight part;

$T_0$ is the wall thickness of the straight part;

D is the outside diameter of the bent part at a given angle $\phi$;

t is the wall thickness of the bent part at a given angle $\phi$;

R is the radius curvature of the bent part; $\phi$ is an angle in a plane perpendicular to the central longitudinal axis of the bent part and measured from a diametral line in said plane perpendicular to a further diametral line in said plane and extending on the radius of curvature of the bent part, $\phi$ being equal to $-90°$ at a point where said further diametral line crosses the bent part at the inside of the curvature thereof and being equal to $+90°$ at a point where said further diametral line crosses the bent part at the outside of the curvature thereof;

$T_1$ is the wall thickness at $\phi = +90°$;

U is the degree of flattening of the outside diameter of the bent part;

$D_1$ is the minimum outside diameter of the bent part;

$D_2$ is the maximum outside diameter of the bent part; and $T_0 - 0.5\text{mm} > T_1$;

the tensile strength $TS_0$ of the wall thickness $T_0$ of the straight pipe part and the tensile strength $TS_1$ of the wall thickness t of the bent part throughout all said bent part satisfying the condition:

$TS_0 \leqq TS_1$.

* * * * *